Figure 7:
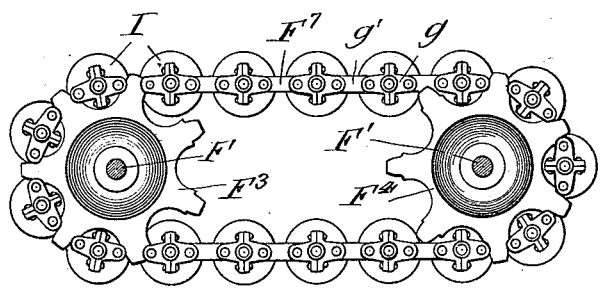

(No Model.) 8 Sheets—Sheet 1.
A. CAMPBELL.
COTTON PICKING MACHINE.
No. 542,794. Patented July 16, 1895.
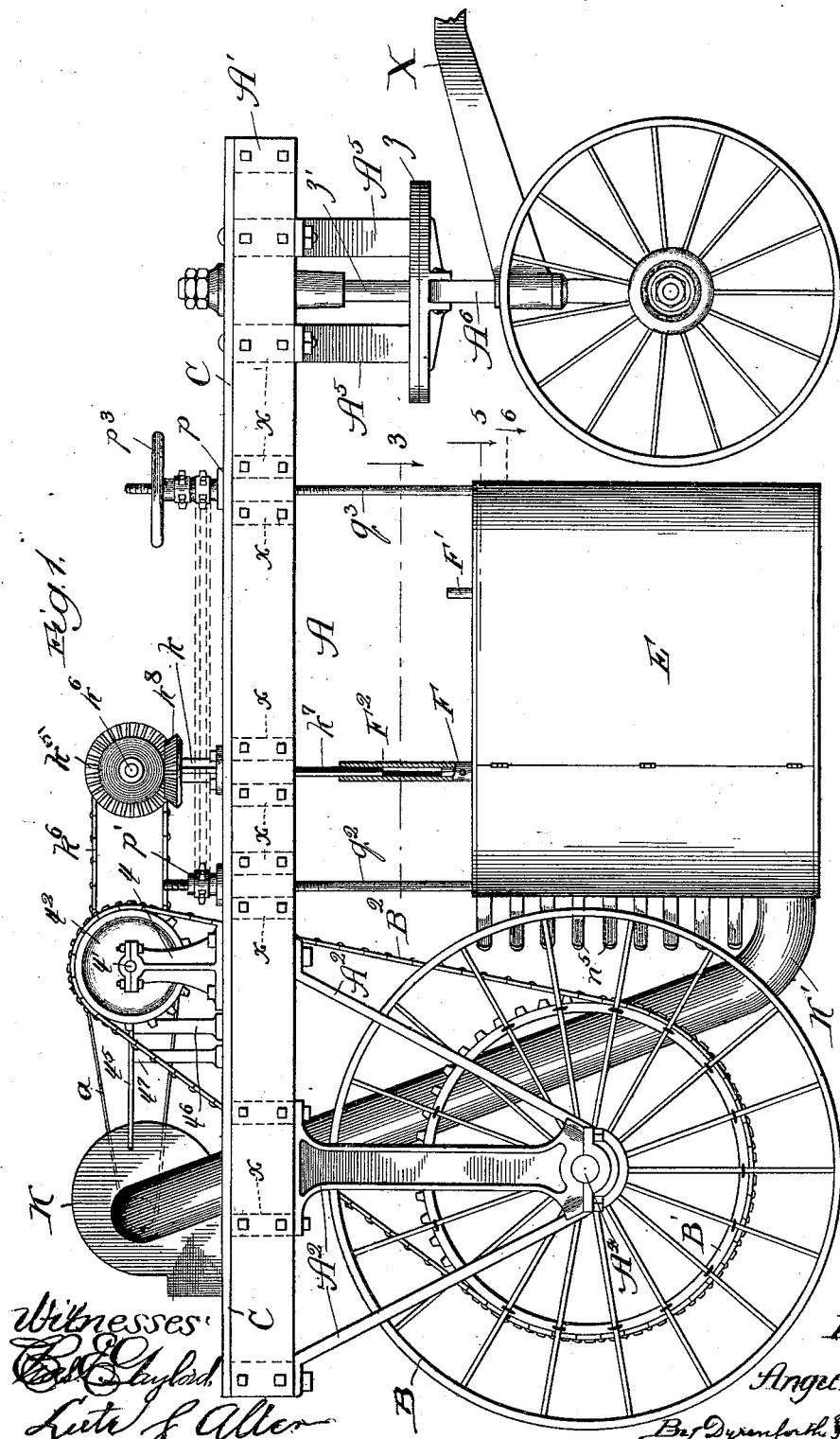

(No Model.) 8 Sheets—Sheet 2.
A. CAMPBELL.
COTTON PICKING MACHINE.
No. 542,794. Patented July 16, 1895.
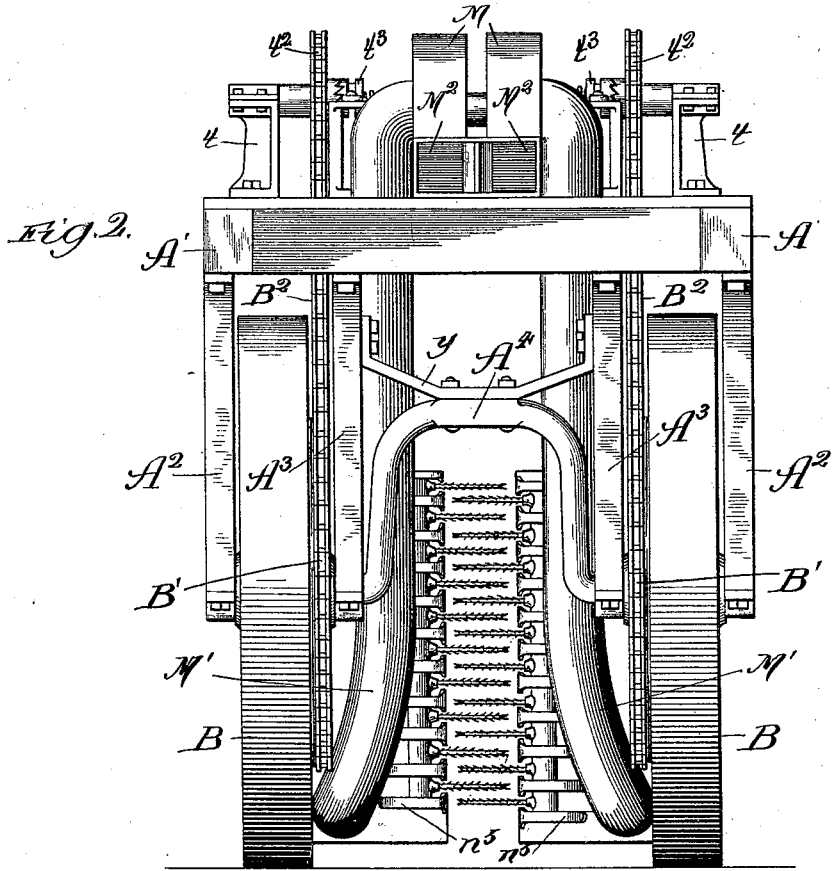
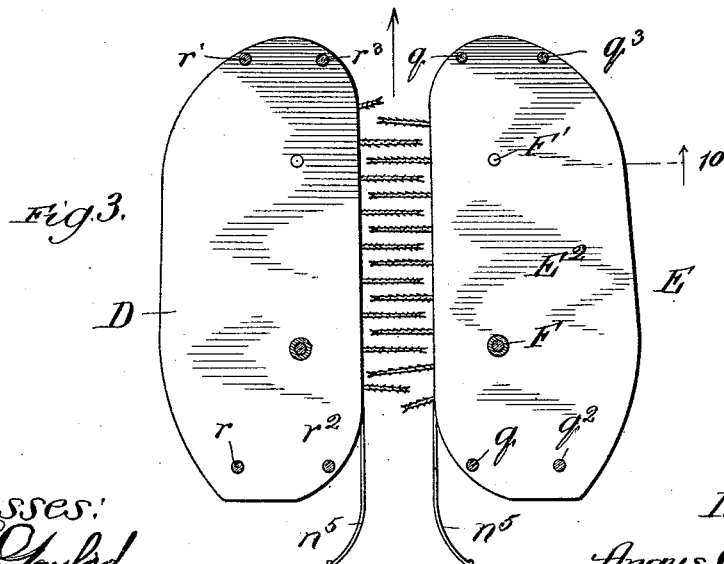
Witnesses:
Carl E Gaylord,
Lute J. Alter
Inventor:
Angus Campbell,
By Dyrenforth & Dyrenforth,
Attys.

(No Model.) 8 Sheets—Sheet 3.
A. CAMPBELL.
COTTON PICKING MACHINE.
No. 542,794. Patented July 16, 1895.
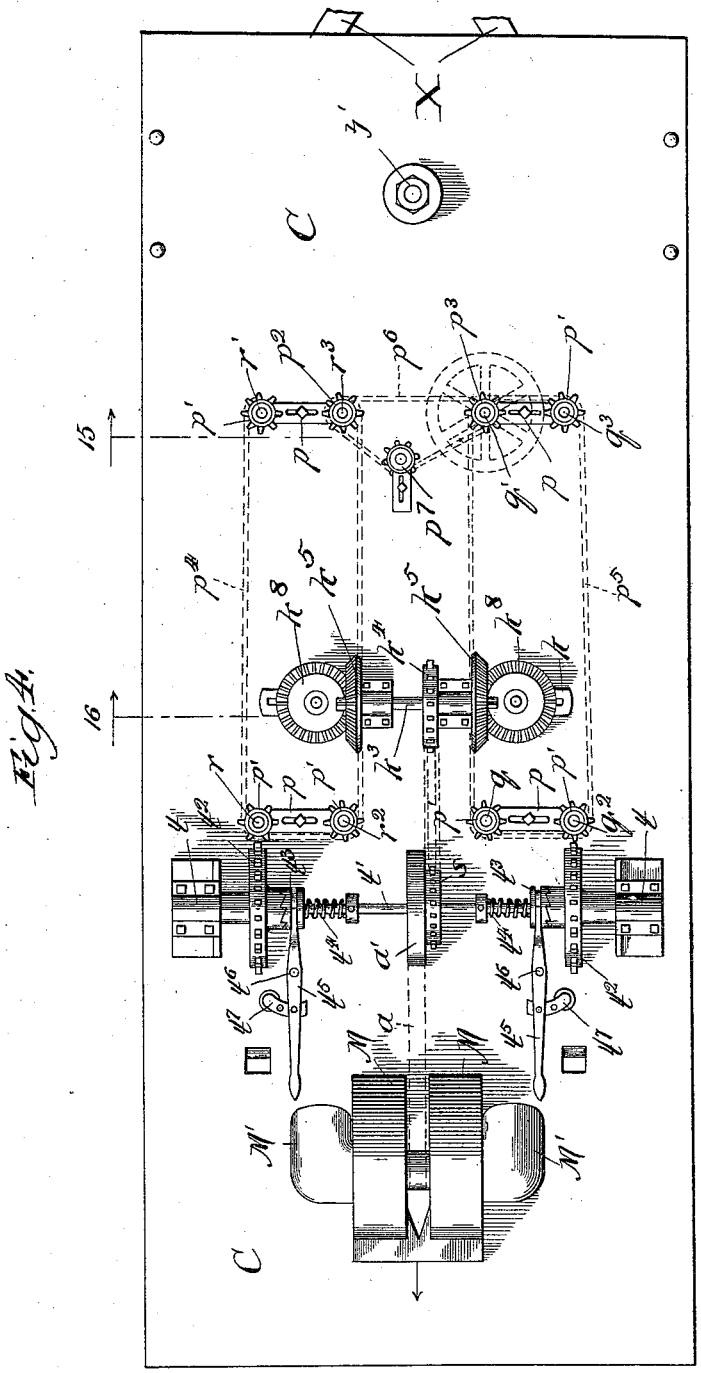
Witnesses:
Inventor:
Angus Campbell,
By Dyrenforth & Dyrenforth,
Attys (No Model.) 8 Sheets—Sheet 4.
A. CAMPBELL.
COTTON PICKING MACHINE.
No. 542,794. Patented July 16, 1895.
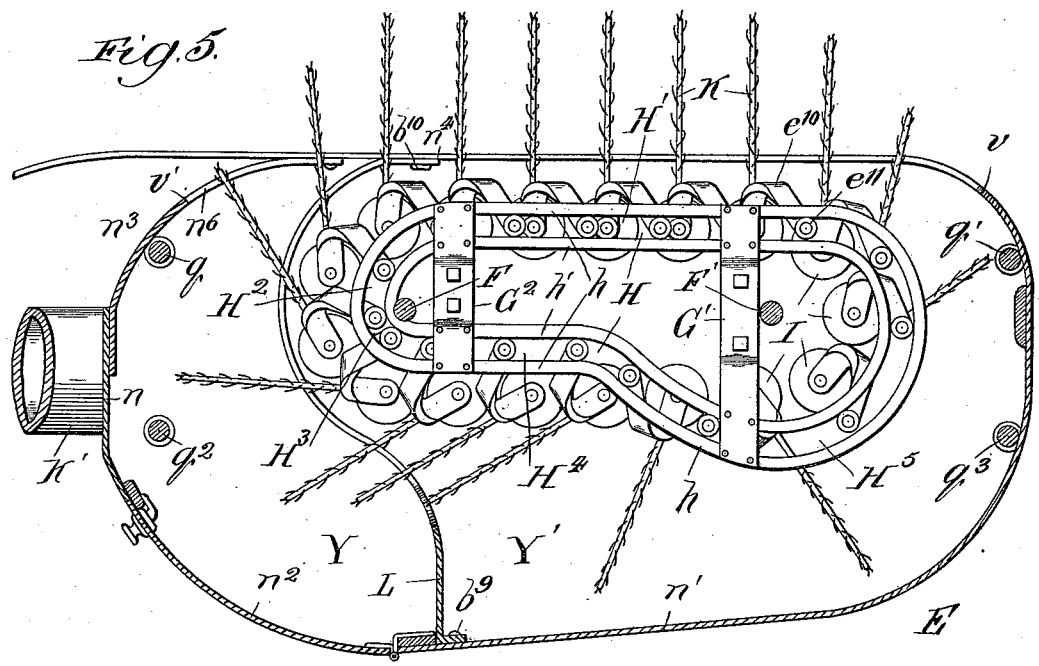
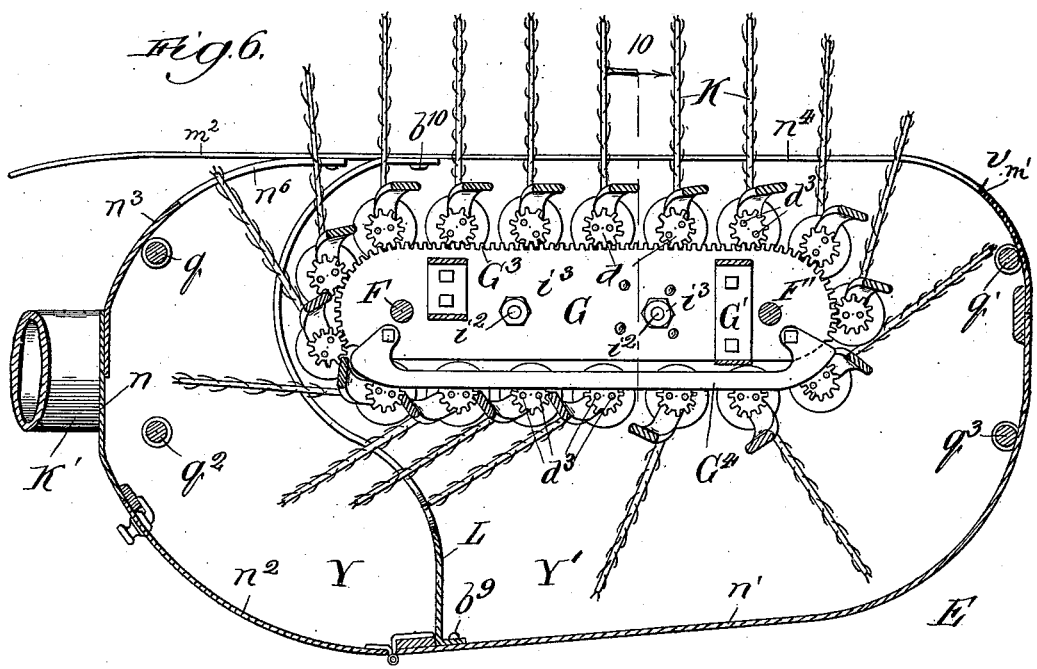
Witnesses:
Inventor:
Angus Campbell,
By Dyrenforth & Dyrenforth,
Attys (No Model.) 8 Sheets—Sheet 5.

A. CAMPBELL.
COTTON PICKING MACHINE.

No. 542,794. Patented July 16, 1895.

Witnesses:
Chas. E. Gaylord
Lutz S. Alter

Inventor:
Angus Campbell
By Dyrenforth & Dyrenforth,
Attys

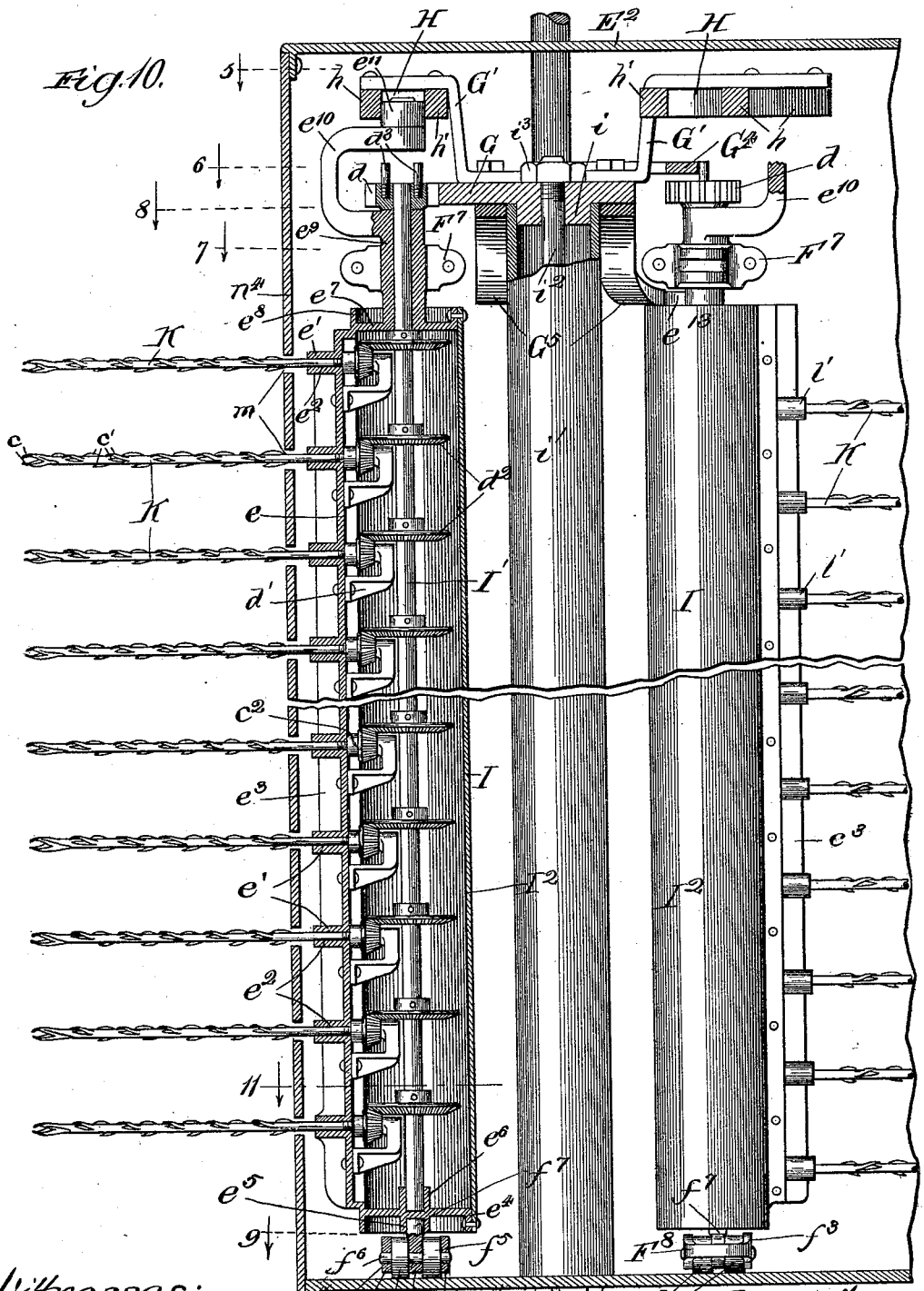

(No Model.) 8 Sheets—Sheet 7.
A. CAMPBELL.
COTTON PICKING MACHINE.
No. 542,794. Patented July 16, 1895.
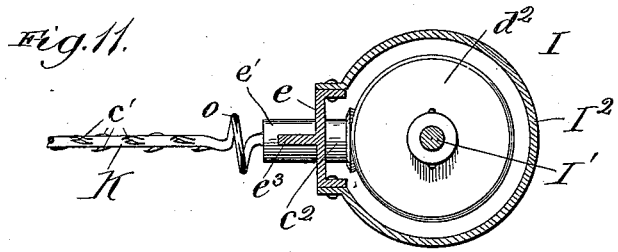
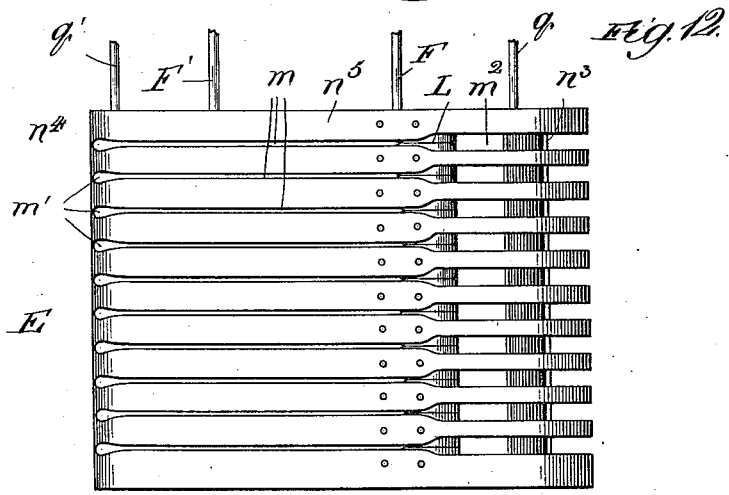
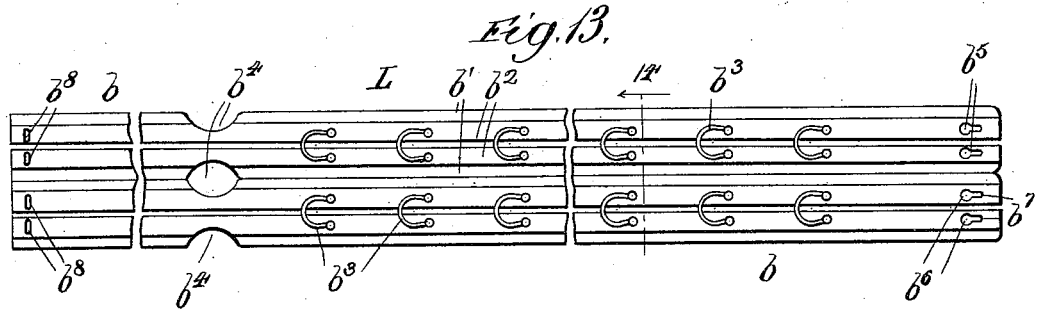
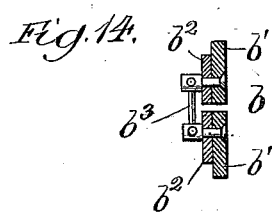
Witnesses:
Inventor:
Angus Campbell,
By Dyrenforth & Dyrenforth,
Attys.

(No Model.) 8 Sheets—Sheet 8.
A. CAMPBELL.
COTTON PICKING MACHINE.
No. 542,794. Patented July 16, 1895.
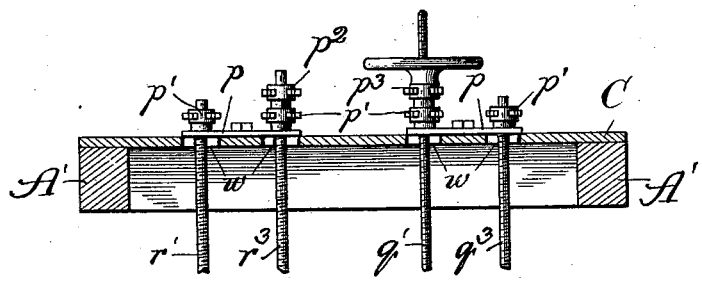
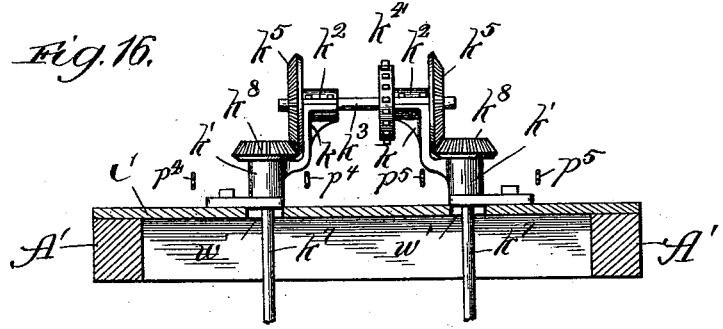
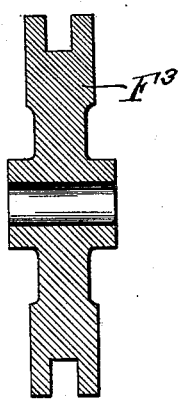
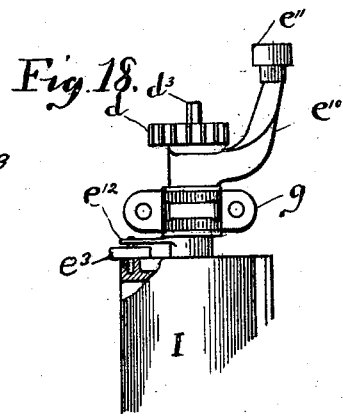
Witnesses:
Inventor:
Angus Campbell,
By Dyrenforth & Dyrenforth,
Att'ys.

UNITED STATES PATENT OFFICE.

ANGUS CAMPBELL, OF CHICAGO, ILLINOIS, ASSIGNOR, BY DIRECT AND MESNE ASSIGNMENTS, TO THE AMERICAN COTTON PICKER COMPANY, OF SAME PLACE.

COTTON-PICKING MACHINE.

SPECIFICATION forming part of Letters Patent No. 542,794, dated July 16, 1895.

Application filed November 2, 1893. Serial No. 489,815. (No model.)

*To all whom it may concern:*

Be it known that I, ANGUS CAMPBELL, a subject of the Queen of Great Britain, residing at Chicago, in the county of Cook and State of Illinois, have invented a new and useful Improvement in Cotton-Picking Machines, of which the following is a specification.

My invention relates to improvements in machines for use in the field in picking cotton from the plants; and my object is to provide a machine for the purpose of generally-improved construction, whereby in operation it will gather in and deposit in receptacles provided for the purpose the cotton from all open bolls of a plant quickly, effectively, and without injury to green bolls, blooms, or stalks.

Broadly stated my improved machine involves the following general features: The framework of the machine is mounted upon running-gear and affords a central longitudinal passage, which straddles and overrides the plants in the progress of the machine, and working across said passage from opposite sides are series of picker fingers or spindles of novel construction, which are thrust longitudinally into and revolved in the plant to gather cotton from the open bolls and then withdrawn longitudinally from the plant and passed across stripper mechanism to strip the cotton from the fingers and deposit it in receptacles. In the machine illustrated the cotton deposited into the receptacles by the stripping mechanism is withdrawn therefrom by means of blowers into a wagon traveling at the side or rear of the machine or into sacks, as desired.

Figure 8:
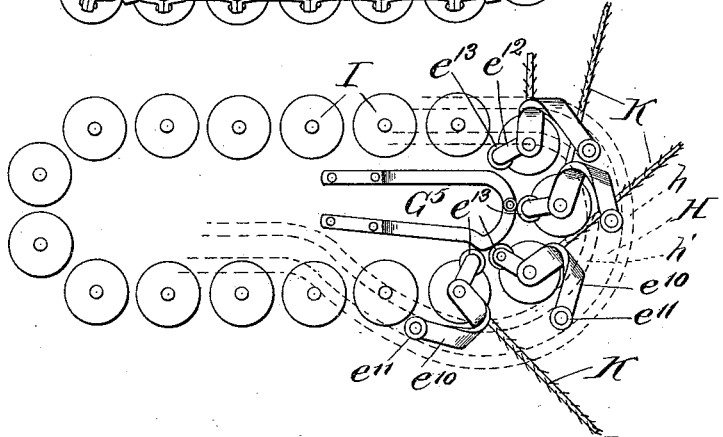
Figure 9:
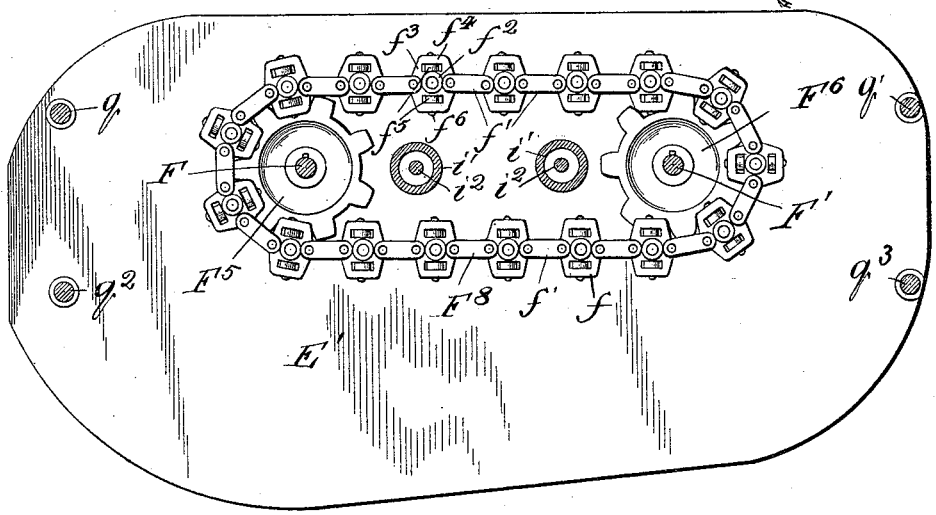

In the drawings, Figure 1 is a view in side elevation of my improved machine; Fig. 2, a rear elevation of the machine; Fig. 3, a plan section taken on line 3 of Fig. 1 and viewed in the direction of the arrow; Fig. 4, a top plan view of the machine; Figs. 5 and 6, enlarged broken plan sectional views taken, respectively, on lines 5 and 6 of Fig. 1, corresponding with lines 5 and 6 of Fig. 10; Figs. 7, 8, and 9, detail plan and diagrammatic views upon the same scale of measurement as Figs. 5 and 6 and taken, respectively, on lines 7, 8, and 9 of Fig. 10; Fig. 10, an enlarged broken vertical section taken on line 10 of Fig. 6, corresponding with line 10 of Fig. 3 and viewed as indicated by the arrows; Fig. 11, a broken detail sectional view of one of the traveling carrier-tubes, taken on line 11 of Fig. 10 in the direction of the arrow and showing the preferred form of picker-finger shank; Fig. 12, a view in elevation of the inner side of one of the casings in which the carrier-tubes are inclosed and through which the picker-fingers are thrust and travel in the operation of the machine; Fig. 13, a broken detail face view of a pair of stripper-strips forming part of the stripper mechanism; Fig. 14, a section taken on line 14 of Fig. 13 and viewed in the direction of the arrow; Figs. 15 and 16, broken sections of the upper part of the machine, taken, respectively, on lines 15 and 16 of Fig. 4; Fig. 17, a section of a sprocket-wheel forming one of the details of construction, and Fig. 18 a broken view of the upper end portion of a carrier-tube.

A is the framework of the machine, involving side rails A' and a series of cross-bars, the ends of which are indicated in Fig. 1 by dotted lines at $xx$, the cross-bars being bolted at their ends to the side rails, as indicated, or fastened in any other suitable manner. Extending downward from the rear portion of the frame A are outer brackets $A^2$ and inner brackets $A^3$. Extending at its opposite end portions through the lower portions of the brackets $A^2 A^3$ is a bent axle $A^4$, which between each pair of brackets $A^2 A^3$ affords a bearing for a drive-wheel B. At the top and center of its bent portion the axle is braced by means of a cross brace-bar $y$, secured at its opposite ends, respectively, to the brackets $A^3$, as shown in Fig. 2.

On the inner face of each drive-wheel B and substantially integral therewith is a sprocket-wheel B'. On the frame A are brackets $t$, affording at their upper ends journal-bearings for the opposite ends of a cross-shaft $t'$. Adjacent to the brackets $t$ and loosely mounted upon the shaft $t'$ are sprocket-wheels $t^2$, serrated at the inner faces of their hubs to afford clutch members and geared by means of drive-chains $B^2$ to the sprocket-wheels B'. Adjacent to the hubs of the sprocket-wheels $t^2$ and feathered upon the shaft $t'$ are rotary sliding clutch members $t^3$, held normally in engagement with the clutch-faces of the hubs by confined springs $t^4$ on the shaft $t'$. Engaging the clutch members $t^3$, without interfering with their rotation, are shipping-levers $t^5$ pivoted upon standards $t^6$ to swing in the horizontal plane. Between their handles and pivots the shipping-levers $t^5$ are provided with pin-holes and move upon arms $t^7$, provided each with two pin-holes. When the levers are moved to cause their pin-holes to register with the inner pin-holes of the arms $t^7$ the clutch members $t^3$ engage and rotate with the sprocket-wheels $t^2$. When the shipping-levers are swung against the resistance of the springs $t^4$ to cause their pin-holes to register with the outer pin-holes of the arms $t^7$, the clutch members $t^3$ on the shaft $t'$ are disengaged from the hubs of the sprocket-wheels $t^2$.

To fasten the shipping-levers in either adjusted position pins are passed through the pin-holes of the levers into the respective pin-holes of the arms $t^7$. Fixed to the shaft $t'$, toward the center of the latter, is a sprocket-wheel $s$. The frame A at its forward end is provided with downward-extending brackets $A^5$ carrying the upper member of a fifth-wheel or turn-table $z$. The forward wheels of the running-gear are mounted upon a bent axle $A^6$, corresponding in shape to the axle $A^4$ described. On the center of the bent portion of the axle is the lower member of the turn-table $z$, the parts being held together by a king-bolt $z'$ in a usual manner. The tongue X is bifurcated and bent downward at its rear end portion and secured at the ends of its forks to the axle $A^6$, as indicated in Fig. 1. The tongue will thus override the cotton-plants and the animals drawing the machine will travel on opposite sides thereof.

Mounted upon the side rails A' and cross-rails is a platform C, which extends below the brackets $t$, standards $t^6$, and arms $t^7$ and is provided with slots for the passage of the drive-chains $B^2$. Extending at their upper ends through the platform C are four hanger-rods $r$, $r'$, $r^2$, and $r^3$, respectively in the relative positions shown at one side of the longitudinal center of the machine, and four hanger-rods $q$, $q'$, $q^2$, and $q^3$, respectively in the relative positions shown on the opposite side of the longitudinal center of the machine. The rods are threaded at their upper end portions and extend through elongated slots $w$ in the platform C and laterally-adjustable plates $p$, fastened upon the platform.

On the threaded portions of the hanger-rods $r$ $r'$ $r^2$ and $q$ $q^2$ $q^3$ are adjusting-nuts $p'$ in the form of small sprocket-wheels, as indicated. On the rod $r^3$ is an adjusting-nut $p^2$ in the form of two sprocket-wheels cast integral one above the other. On the hanger-rod $q'$ is an adjusting-nut $p^3$, formed, like the adjusting-nut $p^2$, with one sprocket-wheel above the other, and also a hand-wheel, all cast in one piece.

On one side of the machine the sprocket-wheels $r$ $r'$ $r^2$ and the lower sprocket-wheel of the adjusting-nut $p^2$ are geared together by a continuous drive-chain $p^4$, and on the other side of the machine the sprocket-wheels $q$ $q^2$ $q^3$ and the lower sprocket-wheel of the adjusting-nut $p^3$ are geared together by a continuous drive-chain $p^5$. The upper sprocket-wheels of the adjusting-nuts $p^2$ $p^3$ are geared together by a continuous drive-chain $p^6$, which travels over an idler $p^7$, adjustable to a limited extent longitudinally of the machine. Turning of the adjusting-nuts upon the hanger-rods causes them to bear against the respective plates $p$ and raise or lower the hanger-rods vertically, depending upon the direction in which the nuts are turned. The sets of adjusting-nuts upon each side, respectively, being geared together by the drive-chains $p^4$ $p^5$ and the sets to each other by the drive-chain $p^6$, the raising and lowering of all the hanger-rods may be accomplished equally and simultaneously by the turning of the hand-wheel of the adjusting-nut $p^3$.

The sets of hanger-rods $r$ $r'$ $r^2$ $r^3$ and $q$ $q'$ $q^2$ $q^3$ are each secured at their lower ends to base-plates, respectively, of suspended side frames or casings D and E, each frame or casing inclosing separate but co-operating cotton picking and stripping mechanisms. The casings D and E are of the same shape in cross-section, as shown in Fig. 3, and as the cotton picking and stripping mechanisms in the two casings are of substantially similar construction it has been thought sufficient in the present drawings to illustrate in detail the mechanism inclosed in one casing—namely, the casing E.

The mechanisms in the two casings, though relatively reversed, are in every material detail the same. Therefore in the description which follows it will be understood that for each piece of mechanism described in the casing E a corresponding piece exists in the casing D. Where parts of the mechanism in the casing D appear upon the drawings they will be designated by the same reference letters and numerals as the corresponding parts in the casing E.

The casing E is formed with a base-plate E' rigidly secured to the lower ends of the hanger-rods $q$ $q'$ $q^2$ $q^3$, as before stated, a top plate $E^2$ and a body portion affording the sides and ends, consisting of plates $n$ $n'$ of the form in cross-section indicated in Figs. 5 and 6 and separated by a door $n^2$ hinged to the plate $n'$ and provided with a latch to engage the plate $n$ when closed, a plate $n^3$, and a plate $n^4$. The plate $n^4$ is shown in detail in Fig. 12, and consists for the greater part of its extent of a series of horizontal slats $n^5$ separated by slits $m$ in the plate, extending from the point $v$ to its rear end. The slits or slots $m$ are enlarged at their forward ends to afford the openings $m'$ and widened at their rear end portions to afford the enlarged elongated openings $m^2$. The plate $n^3$ is secured to the plate $n^4$ a little in advance of the enlarged openings $m^2$ and is slotted from its forward edge to a point $v'$, Fig. 5, to afford horizontal slats $n^6$ separated by elongated slots which register with the slots $m$.

Journaled at their lower ends in the base-plate E' are two vertical shafts F and F' in the relative positions shown. At their upper end portions the said shafts pass through the top plate $E^2$. The rear shaft F is the drive-shaft and carries at its upper end above the plate $E^2$ a vertical sleeve $F^2$, affording a squared socket. (See Fig. 1.)

Mounted upon the platform C are brackets $k$ $k$ (see Fig. 16) affording vertical bearings $k'$ and horizontal bearings $k^2$. The brackets are formed with base-plates, which are bolted in position upon the platform C in a manner to render them adjustable to a limited extent in the direction crosswise of the machine. Journaled toward its opposite ends in the bearings $k^2$ is a horizontal shaft $k^3$, provided between the said bearings with a sprocket-wheel $k^4$ and beyond said bearings with beveled gear-wheels $k^5$. The gear-wheels $k^5$ are feathered upon the shaft $k^3$, so that they may be shifted longitudinally thereon when it is desired to increase or diminish the distance between the casings D and E, as hereinafter described. The sprocket-wheel $k^4$ is geared to the sprocket-wheel $s$ on the shaft $t'$ by a drive-chain $k^6$. Journaled at their upper end portions in the bearings $k'$ are vertical shafts $k^7$ $k^7$, carrying above the said bearings beveled gear-wheels $k^8$ in mesh with the beveled gears $k^5$. The shafts $k^7$ extend downward through elongated slots $w'$ in the platform C, and along their lower end portions they are squared to fit the squared sockets afforded by the sleeves $F^2$.

Below the top plate $E^2$ of the casing E is an oblong plate G with rounded ends. Toward its opposite end portion the plate G is provided on its under side with short circular bosses $i$ to receive the ends of vertical tubes $i'$, which at their lower ends rest upon the base-plate E'. Passing through each tube $i'$, the base E', and plate G is a bolt or tie-rod $i^2$, threaded at its upper end to receive a nut $i^3$ above the plate G. The bolts $i^2$ with the nuts $i^3$ serve to clamp the plate G firmly in position upon the upper ends of the tubes $i'$. The vertical shafts F F' pass through opposite end portions of the plate G, and the latter thus affords bearings for the upper end portions of those shafts. Bolted or otherwise secured upon the plate G are a forward bracket G' and a rear bracket $G^2$. (See Figs. 5, 6, and 10.) Fastened to the under surfaces of the brackets G' and $G^2$ are outer and inner endless rails $h$ $h'$, respectively, which extend in the horizontal plane and are equidistant apart at all points to afford between them an irregular cam-guide H. The direction of extent of the cam-guide H is shown in Fig. 5. It affords a straight section, as shown at H', along its inner side, a sweeping section for a distance of about a half-circle, as indicated at $H^2$, an abrupt section, as indicated at $H^3$, a short straight section, as indicated at $H^4$, and a sweeping more or less elliptical section, as indicated at $H^5$. Along the inner edge and part way around its ends the plate G is serrated to afford a rack $G^3$. In a plane just below the plate G the shafts F F' carry sprocket-wheels $F^3$ $F^4$, respectively, the sprockets of which are bifurcated at their outer end portions, as indicated in Fig. 17. Above and close to the base-plate E' the shafts F F' carry sprocket-wheels $F^5$ $F^6$ of the form shown in Fig. 9. Passing around the sprocket-wheels $F^3$ $F^4$ and gearing them together is a drive-chain $F^7$, (illustrated in Fig. 7,) links of which afford bearings for journals hereinafter described. In the construction shown the drive-chain $F^7$ comprises journal-bearing links $g$ and intervening links $g'$. The links $g$ are in two parts riveted together, each part affording one-half of the journal-bearing. At their opposite ends the links $g$ are pivotally connected to the ends of the intervening links $g'$, as shown.

Extending around the lower sprocket-wheels $F^5$ $F^6$ and gearing them together is a drive-chain $F^8$, (see Figs. 9 and 10,) constructed of links $f$ and $f'$. Each link $f$ comprises a frame consisting of a central bar $f^2$, end bars $f^3$, and side bars $f^4$, all cast together. Between the side bars and center bar are vertical openings to receive caster-wheels $f^5$ $f^5$ journaled upon a common pin $f^6$, which passes through the side and center bars. On the top and center of the center bar $f^2$ is a short upward-projecting circular lug $f^7$. The intervening links $f'$ are pivotally connected at their opposite ends to the end bars $f^3$ of the wheeled links $f$.

Connected to the drive-chains $F^7$ $F^8$ are carriers I, in the form, preferably, of vertical tubes, which carry the picker-fingers and the mechanisms for rotating them. I prefer to form each tube I as shown in Figs. 10 and 11, in which $e$ represents a front strip, preferably of cast metal. At equal distances from each other in the vertical plane the strip $e$ is formed with lugs $e'$, provided with horizontal openings $e^2$, and stretching from lug to lug are sections of a vertical strengthening-rib $e^3$, which extends practically from the topmost lug $e'$ to the lower end of the casting. Cast integral with the part $e$ is the base $e^4$ provided with a circumferential downward-projecting flange and a central socket-piece $e^5$ adapted to fit loosely over the lug $f^7$ of a wheeled link $f$ of the drive-chain $F^8$. On the upper side of the base $e^4$ is a central socket-piece $e^6$. Cast integral with the part $e$ is a top plate $e^7$, provided with a circumferential upward-extending flange $e^8$. Rising from the center of the top plate $e^7$ and cast integral therewith is a sleeve $e^9$, provided at its upper end with an arm $e^{10}$. The shank portion of the sleeve $e^9$ presents a smooth annular surface and passes through the journal-bearing openings of the links $g$ of the drive-chain F⁷. The arms $e^{10}$ of the carrier-tubes I each describe the spiral curve indicated most plainly in Fig. 8, and at their upper ends they carry friction-rollers $e^{11}$, which travel in the cam-guide H. Extending from one side of the sleeve $e^9$ below the drive-chain F⁷ is a bearing projection $e^{12}$ for a horizontal friction-roller $e^{13}$, which is held between the bearing projection $e^{12}$ and tube-top $e^7$.

Each tube I contains a vertical shaft I′ journaled at its lower end in the socket-piece $e^6$ and extending through and journaled at its upper end in the sleeve $e^9$. Above the said sleeve the shaft is provided with a pinion $d$. At each opening $e^2$ is a bracket $d'$, affording at its free end a journal-bearing in line with the opening $e^2$. The body portion of the tube I is formed of a curved sheet-metal plate $I^2$, riveted along its vertical edges to the opposite edges of the front plate $e$ and at its upper and lower ends to the circumferential flanges of the top and bottom plates of the tube.

The tubes I carry series of revolving picker-fingers K. Each finger K is in the form of a spindle, provided at its free end with a short sharp-pointed spiral fork $c$. Along the body portion of the spindle are a number of spirally-projecting points $c'$. The shank portion of each spindle between the points $c'$ and its inner end is smooth and extends loosely through an opening $e^3$ of the tube. At its inner end portion each spindle or finger K extends into and is journaled in the bearing afforded by a bracket $d'$. Fixed upon each finger or spindle K between the bearings $d'$ and $e^2$ is a beveled pinion $c^2$. On the shaft I′ are a series of beveled gear-wheels $d^2$, there being one such wheel at each bracket $d'$, meshing with a pinion $c^3$.

On each pinion $d$ is a pair of upward-projecting pins $d^3$, and in the path of the said pins is a cam-guide $G^4$ for a purpose hereinafter described. On the under side of the rack-plate G, in the position indicated in Fig. 8, is a cam-guide $G^5$ in the path of the friction-rollers $e^{13}$, the purpose of which will be explained later on.

L is the stripper mechanism which extends across the inner part of the casing E, dividing the latter into two chambers Y Y′. The stripper mechanism is formed of a series of stripper-strips $b$, which together afford the irregular diaphragm L across the casing, as shown in Figs. 5 and 6. As I prefer to construct the stripper mechanism each stripper-strip $b$ is formed of two flexible and parallel strips $b'$ $b'$ and two narrower, preferably metal, strips $b^2$ $b^2$. (See Figs. 13 and 14.) The strips $b^2$ are fastened to the strips $b'$ in a manner to permit the outer edges of the strips $b'$ to project a short distance beyond the outer edges of the metal strips, and to afford a stripper-strip $b$ two strips formed by the strips $b'$ $b^2$ are held together in yielding relation by means of springs $b^3$. Near what may be termed the "rear ends" of the stripper-strips are notches $b^4$, which, when the strips are placed side by side, as indicated in Fig. 13, afford openings in a position and for a purpose hereinafter described. The stripper-strips are placed close together, as indicated, and the parting-lines between the strips are in the horizontal planes and register with the slots $m$ of the slatted side $n^4$ of the casing E. The stripper-strips are provided at their forward ends with openings $b^5$, elongated in the direction longitudinally of the strips and having enlarged portions $b^6$ and reduced portions $b^7$. At their rear ends the strips $b$ are provided with elongated openings $b^8$. In placing the strips in position they are fastened at the openings $b^8$ to buttons $b^9$ on the wall $n'$ of the casing E, and the openings $b^5$ are passed at their enlarged parts $b^6$ over buttons $b^{10}$ on the slats $n^5$ of the wall $n^4$ of the casing E. The natural springiness of the stripper-strips causes them to draw the reduced parts $b^7$ of the openings $b^5$ below the heads of the buttons, whereby they are held firmly in place. The elongated openings $b^8$ admit of slight lateral play of the stripper-strips on the buttons $b^9$.

The operation of my improved machine is as follows: The machine is drawn across the field in a manner to straddle a row of plants, whereby the casings D and E will pass respectively across opposite sides thereof. The rotation of the rear wheels B of the running-gear and sprocket-wheels B′, carried by said wheels, rotates the sprocket-wheels $t^2$. The clutch members $t^3$, being in engagement with the hubs of the sprocket-wheels $t^2$, cause the shaft $t'$ and sprocket-wheel $s$ to revolve and turn the sprocket-wheels $k^4$ and shaft $k^3$. This causes the various mechanisms in the casing E and corresponding mechanisms in the casing D to operate, as follows: Through the beveled gears $k^5$ $k^8$ the shaft $k^7$, and consequently the drive-shaft F, is rotated to turn the sprocket-wheels $F^3$ $F^5$ and propel the drive-chains $F^7$ $F^8$ in the direction, at the inner side, opposite to that of the progressive movement of the machine. In the movement of the tubes I along the inner side of the casing the engagement of the pinions $d$ with the rack $G^3$ causes the shafts I′ to be rotated and to rotate the picker-fingers K on their axes in the direction which will cause the spiral points $c$ $c'$ to engage and wind upon the spindles the cotton from any open bolls of a plant with which they may engage. The tubes I rest upon the wheeled links or casters $f$, which travel upon the base-plate E′ with a minimum friction. In the progress of the tubes I the friction-wheels $e^{11}$ of the arms $e^{10}$ travel in the cam-guide H. The picker-fingers as they pass along the side $n^4$ extend through and travel at their shank portions in the slots $m$, and registering with each slot $m$, as before stated, is a slot in the wall $n^3$ and slit between stripper-strips $b$. The friction-rollers $e^{11}$ are so placed with relation to the picker-fingers that while traveling in the backward direction along the inner side of the machine the picker-fingers during the engagement of the friction-rollers $e^{11}$ with the part H' of the cam-guide are maintained in a position at right angles to the direction of progress of the machine. While the friction-rollers travel through the part $H^2$ of the cam-guide the points of the respective picker-fingers are swung to a comparatively slight extent in the backward direction and the fingers are withdrawn longitudinally through the enlarged openings $m^2$ between the slats $n^5$, through the respectively coincident slots in the plate $n^6$, and partially through the coincident slits between stripper-strips $b$. When the friction-rollers $e^{11}$ travel through the part $H^3$ of the cam-guide, the picker-fingers are swung around quickly in the arc of the adjacent portion of the stripper-frame L, and while traveling along the part $H^4$ of the cam-guide the picker-fingers are withdrawn longitudinally through the slits of the stripper-frame. As the friction-rollers $e^{11}$ travel around the part $H^5$ of the cam-guide the respective tubes I are turned on their axes a distance approximating half a circle, whereby when the free ends of their picker-fingers reach the enlarged openings $m'$ between slats $n^5$, the fingers in the further progress of the tubes are thrust longitudinally outward and swung in the backward direction until the said friction-rollers reach the part H' of the cam-guide, when the fingers extend in a direction at right angles to the plane of progressive movement of the machine.

The sprocket-wheels B' $t^2 s k^4$, gear-wheels $k^5$ $k^8$, sprocket-wheels $F^3 F^5 F^4 F^6$, and pinions $d$ are so constructed and geared with relation to each other that in operation the points of the picker-fingers travel in the backward direction at a speed approximating the forward progress of the machine. Therefore in passing across a cotton-plant the points of the picker-fingers are thrust into the plant in a plane at right angles to that of the progress of the machine and remain approximately stationary with relation to the plant until withdrawn, and while leaving the plant the points of the picker-fingers are withdrawn in a plane at right angles to the progress of the machine. After the pinions $d$ have left the rack $G^3$ the pins $d^3$ thereon meet the guide $G^4$, which latter operates to maintain the pinions in a position whereby their teeth will mesh with the teeth at the forward end of the rack when the rack is reached. While the tubes I pass about the forward end of the rack G and the rollers $e^{11}$ around the part $H^5$ of the cam-guide there is danger, without some means provided to prevent it, that the roller and tube, if permitted to travel together in a plane radially of the shaft F', will bind between the rack and cam-guide. To overcome this difficulty the cam-guide $G^5$ above referred to, and shown in Figs. 8 and 10, is provided in the path of the friction-rollers $e^{13}$. The bearings for the roller $e^{13}$ on each tube extend from the sleeve $e^9$ in a direction with relation to the position of the roller $e^{11}$ which will cause the roller $e^{13}$ to engage the cam-guide $G^5$. The guide $G^5$ operates as a means for steadying the tubes while the picker-fingers are being thrust outward, and by engaging the friction-rollers $e^{13}$ they tend to retard the progress of the inner sides of the tubes, causing the tubes to turn on their axes to a slight extent and to advance the rollers $e^{13}$ slightly, whereby all danger of binding of the parts between the cam-guide and rack is overcome. This prevents any wrenching effect upon the drive-chain $F^7$ which such binding might produce.

As shown in Figs 2 and 3, the picker-fingers projecting inward from opposite sides of the machine intermesh, and they are so located with relation to each other that vertical and horizontal rows of fingers at one side of the machine will extend midway of the vertical and horizontal rows of fingers projecting from the opposite side of the machine. Thus all the fingers will be approximately equidistant from each other as they extend from the inner sides of the machine.

The points on the ends and along the body portions of the picker-fingers are preferably formed by cutting and bending the metal of the fingers and are preferably turned inward at their outer extremities, whereby they will pass across green bolls, leaves, branches, and stalks without engaging them. The free ends of the points, however, will readily engage the fibers of cotton when they strike an open boll.

In operation in the field as the machine passes across a plant picker-fingers are thrust into the plant and revolved therein without materially changing their position with relation to the plant. In practice the fingers are just far enough apart to prevent them, when they are thrust into the plant, from engaging and tearing the green bolls. Each open boll of cotton will be engaged by the points of one, two, or more of the picker-fingers and the contents of the boll quickly gathered up by being wound upon the fingers. As the fingers are withdrawn from the plant the latter is held up and steadied, while the cotton is being withdrawn, by the backward-projecting slats of the coincident sides $n^4$ of the casings D and E. While being withdrawn through the enlarged openings $m^2$ between slats $n^5$ and through the slots in the plates $n^3$ the pinions $d$ are still in engagement with the rack and revolving the fingers, whereby there is no danger of the cotton being stripped from the fingers before it has passed into the compartment Y. The pinions $d$ are disengaged from the rack at the moment the drive-chains are given a backward turn to withdraw the fingers longitudinally through the strippers, and the pins $d^3$ then engage the guide $G^4$. In the initial withdrawing of the picker-fingers through the strippers the natural looseness of the gearing will permit the picker-fingers to be turned on their axes part of a revolution in the initial action of withdrawing the spiral points through the cotton held thereby against the strippers. This backward turn given to the picker-fingers tends to loosen the spiral points from the cotton, whereby the latter is readily slid from the picker-fingers by the strippers in the forward progress of the tube. At the points where the outer ends of the picker-fingers leave the strippers the enlarged openings $b^4$ are provided for the following purpose: The flexible edges of adjacent stripper-strips $b$ are caused, preferably, to meet, as shown in Fig. 13, and yield by their own flexibility and that of the springs $b^3$ while the picker-fingers are passing between them. After the passage of the fingers the edges of the stripper-strip close together, and in doing so are apt to engage and hold small portions of the cotton. The succeeding picker-finger passing between the strippers will advance the loose cotton along the strippers to the openings $b^4$, where the cotton will be freed from the strips and fall off. Were it not for the openings $b^4$ the cotton thus forced ahead by the fingers would tend to clog the strips at the points where the fingers leave the strippers. As before stated, the edges of the stripper-strips are yielding and of a flexible material, which is preferably leather, and as the picker-fingers are withdrawn between the strippers the spiral points wipe across the leather. This action has a tendency to whet the points and keep them sharp.

The cotton stripped from the picker-fingers by the strippers L falls into the receptacles Y, and in connection with the receptacles Y I provide blower mechanism for withdrawing the cotton from the said receptacles and discharging it into a wagon, bags, or other suitable receptacles at the sides or rear of the machine. Mounted upon the rear portion of the platform C is a blower or exhaust-fan M, geared by means of a belt $a$ to a pulley $a'$ on the shaft $t'$. Extending from opposite sides of the blower to the lower parts of the receptacles Y of the casings D E, respectively, are blower-pipes M'. At the rear and base of the blower are discharge-openings $M^2$. The cotton falling into the receptacles Y is elevated and discharged by the action of the blower from the rear part of the machine.

When thrust into a plant the picker-fingers are apt to strike the stalk thereof, and it is desirable therefore that the fingers shall be, in a measure at least, laterally yielding, so that they may be turned aside by the stalk. To this end I prefer to construct the picker-fingers as shown in Fig. 11. My preferred construction is not shown in the main figures of the drawings, because, owing to the nature of those views, it might tend to confusion. In the preferred construction the shank of the picker-finger, between the first spiral points and the portion which extends through the bearing $e'$, is bent to form a short spiral spring $o$. In the progress of the tubes I and picker-fingers across the inner slatted sides of the casings the springs $o$ travel between the said sides and tubes. While this form of shank is the one preferred, any other suitable construction of spring-shank may be substituted therefor.

When desired, the casings and the mechanisms they contain may be raised and lowered with relation to the main frame by turning the hand-wheel $p^3$, which causes the hanger-rods to be raised and lowered, as described. The casings D and E may be adjusted to a limited extent with relation to each other to move them closer together or farther apart by loosening and shifting the sliding plates $p$ on the platform and the beveled gears $k^5$ on the shaft $k^3$. The idler $p^7$ may also be adjusted to tension the drive-chain $p^6$. In this way the machine may be adjusted, when desired, according to the height and width of the plants to be picked.

While I prefer to construct my improved machine as shown and described, it may be modified in the matter of details of construction without departing from the spirit of my invention as defined by the claims.

What I claim as new, and desire to secure by Letters Patent, is—

1. In a cotton-picking machine, a series of pivotally mounted carriers, supported to travel in an endless course, oblong in the direction of the length of the machine and practically straight sided, picker-fingers on the carriers, means for rotating the picker-fingers on their longitudinal axes and for moving the carriers and turning them on their pivots in the forward progress of the machine, and operating to thrust the picker fingers, near the forward end of their backward course, longitudinally, to an extended position, into the plants, rotate and move the picker-fingers, during their prolonged period of such extension, in the backward direction, and withdraw the picker-fingers, near the rear-end of their backward-course, longitudinally from the plants, substantially as described.

2. In a cotton-picking machine, a series of carriers journaled toward opposite ends in traveling bearings and linked together in endless series, to travel in rotation along an endless course, oblong in the direction of the length of the machine, and practically straight sided, driving means for the carriers, picker-fingers on the carriers, means for turning the carriers when near the forward end of their backward course, and operating in the forward progress of the machine to thrust the picker-fingers longitudinally, to an extended position, into the plants, means for maintaining the picker-fingers extended and for rotating them on their longitudinal axes during their prolonged travel in the backward direction, and means for turning the carriers when near the rear end of their backward course, and operating to withdraw the picker-fingers longitudinally from the plants, substantially as described.

3. In a cotton-picking machine, a series of carriers journaled toward opposite ends in traveling bearings and linked together in endless series, to travel in rotation along an endless course, oblong in the direction of the length of the machine, and practically straight sided, driving means for the carriers, picker-fingers on the carriers, means for turning the carriers, when near the forward end of their backward course, and operating in the forward progress of the machine to thrust the picker-fingers longitudinally, to an extended position, into the plants, means for maintaining the picker-fingers extended and for rotating them, on their longitudinal axes, during their prolonged travel in the backward direction, means for turning the carriers when near the rear end of their backward course and operating to withdraw the picker-fingers longitudinally from the plants, and stripper mechanism in the paths of and engaging the picker-fingers when they are withdrawn from the plants, substantially as and for the purpose set forth.

4. In a cotton-picking machine, the combination with the running gear, of a frame mounted thereon and having a central longitudinal passage adapted to straddle and override a row of cotton-plants, vertically disposed and pivotally mounted carriers connected together in series, the carriers of each series being connected with and actuated from the said running gear to travel an endless path in rotation at a speed approximating that of the progress of the machine, the backward courses of the series, respectively, being approximately straight and parallel at opposite sides of the passage, picker-fingers on the carriers, means for turning the carriers when near the forward ends of their backward courses and operating to thrust the picker-fingers longitudinally to an extended position and cause their outer ends to enter the plants in the progress of the machine in planes approximately at right angles to the plane of progress of the machine, and the picker-fingers of the two opposing series to intermesh in the plants, means for rotating the picker-fingers on their longitudinal axes during their backward progress, and means for turning the carriers, when near the rear ends of their backward courses, and operating to withdraw the picker-fingers longitudinally and cause their outer ends to leave the plants in planes approximately at right angles to the plane of progress of the machine, substantially as and for the purpose set forth.

5. In a cotton picking machine the combination with the main frame, running gear and driving mechanism, of a frame at each side of the machine provided at its inner side with longitudinal slots and each containing a series of vertically disposed traveling carriers, rotary picker-fingers extending from the said carriers in the planes of the said slots, projections on the said carriers, propelling means for each series of carriers connected with the said driving mechanism and operating to move the carriers of each series along an endless course oblong in the direction of the length of the machine and practically straight sided, and cam guides for the said carrier projections operating while the carriers are near the forward end of their backward course to turn them on their vertical axes and thrust the picker-fingers longitudinally through said slots, maintain the picker-fingers extended while the carriers move along their extended course in the backward direction, and then withdraw them longitudinally through the slots, mechanism for rotating the picker-fingers on their axes by the traveling movement of the carriers, and stripper mechanism for the picker-fingers, substantially as described.

6. In a cotton-picking machine, a series of carriers journaled toward opposite ends in traveling bearings and linked together in endless series, to travel in rotation along an endless course, oblong in the direction of the length of the machine and practically straight sided, driving means for the carriers, picker-fingers on the carriers, means for turning the carriers, when near the forward end of their backward course, and operating in the forward progress of the machine to thrust the picker-fingers longitudinally, to an extended position, into the plants, means for maintaining the picker-fingers extended and for rotating them, on their longitudinal axes, during their prolonged travel in the backward direction, means for turning the carriers when near the rear end of their backward course and operating to withdraw the picker-fingers longitudinally from the plants, and stripper mechanism comprising parallel strips having yielding edges between which the picker-fingers are drawn longitudinally in the movement of the carriers in the forward direction, substantially as and for the purpose set forth.

7. In a cotton-picking machine, the combination with the main frame, running gear and driving mechanism, of a frame at each side of the machine provided at its inner side with longitudinal strips separated to afford longitudinal slots between them, a series of vertically disposed traveling carriers in each side frame, rotary picker-fingers extending from the said carriers in the planes of the said slots, propelling means for the carriers connected with the said driving mechanism and operating to move the carriers along an endless course, oblong in the direction of the length of the machine and practically straight sided, a series of parallel stripper strips beyond the rear ends of the said courses on the said side frames, connected at one end with the said longitudinal strips, between the ends of the said longitudinal strips, and presenting slits which register with the said slots, picker-fingers on the carriers movable in the said slots and coincident stripper slits, means for turning the carriers, when near the forward end of their backward course and operating in the forward progress of the machine to thrust the picker-fingers longitudinally through the said slots to an extended position, means for maintaining the picker-fingers extended and for rotating them, on their longitudinal axes, during their prolonged travel in the backward direction, and means for turning the carriers when near the rear end of their backward course and operating to withdraw the picker-fingers longitudinally through the said slots to the stripper strips, the picker-fingers being drawn longitudinally through the stripper strips in the forward movement of the carriers, substantially as and for the purpose set forth.

8. In a cotton-picking machine, the combination of carriers I, each provided with a series of picker-fingers, extending from one side thereof, and supported to travel in an endless course oblong in the direction of the length of the machine and practically straight-sided, a shaft on each carrier geared to the said picker-fingers, a projection on each carrier, a cam in the path of said projections operating by its engagement with the said projections to turn the carriers on their axes at the forward end of their course to thrust the picker-fingers longitudinally into the plants, and turn the carriers on their axes at the rear end of their course to withdraw the picker-fingers longitudinally out of the plants, a pinion on each said shaft and a rack in the path of the said pinions, substantially as and for the purpose set forth.

9. In a cotton-picking machine, the combination with the driving power, of a series of carriers I connected pivotally together to travel an endless course, oblong in the direction of the length of the machine and practically straight sided, a series of picker-fingers journaled in and extending from one side of each carrier, a shaft in each carrier geared to the picker-fingers, an arm upon each carrier, a cam-guide H against which the said arms travel as the carriers are advanced, propelling mechanism connected with the said driving mechanism for advancing the said carriers, and means for rotating the carrier-shafts and through them the picker-fingers in the progress of the carriers, substantially as and for the purpose set forth.

10. In a cotton-picking machine, the combination of a series of carriers I mounted in drive-chains, supported to travel in an endless course oblong in the direction of the length of the machine and practically straight sided, a series of rotary picker-fingers extending from and journaled in one side of each carrier, a rotary shaft in each carrier to which the picker-fingers are geared, a pinion on each said shaft, a rack in the path of the pinions, driving means for the said drive-chains, a projection on each carrier, and a cam-guide H in the path of said projections, whereby the picker-fingers are thrust longitudinally into the plants, maintained extended during their prolonged travel in the backward direction and then withdrawn longitudinally from the plants, substantially as and for the purpose set forth.

11. In a cotton-picking machine, the combination with the running gear of casings D E provided on their inner sides with longitudinal slots, shafts F F' journaled in the said casings, driving means for the shafts actuated from the said running gear, sprocket wheels on opposite end portions of the said shafts, drive chains mounted on said sprocket wheels to travel endless paths, oblong in the direction of the length of the machine, the backward courses of the paths being straight and parallel with the inner sides of the casings, carriers I journaled at opposite ends in the said drive chains, a series of picker-fingers in the planes of said slots extending from and journaled in one side of each carrier, means near the forward end of each backward course in the path of each carrier for turning it on its longitudinal axis and thrusting the picker-fingers longitudinally to an extended position through said slots, means near the rear end of each backward course in the path of each carrier for turning it on its longitudinal axis to withdraw the picker-fingers longitudinally through said slots, and means for rotating the said picker-fingers in the movement of the carriers in the backward direction, substantially as and for the purpose set forth.

12. In a cotton-picking machine, a series of carriers journaled toward opposite ends in traveling bearings and linked together in endless series, to travel in rotation along an endless course, oblong in the direction of the length of the machine and practically straight sided, driving means for the carriers, picker-fingers on the carriers, provided with spirally-projecting cotton-engaging points, shafts on the carriers to which the said picker-fingers are geared, means for turning the carriers, when near the forward end of their backward course, and operating in the forward progress of the machine to thrust the picker-fingers longitudinally, to an extended position, into the plants, means for maintaining the picker-fingers extended during their prolonged travel in the backward direction, means for turning the carriers when near the rear end of their backward course and operating to withdraw the picker-fingers longitudinally from the plants, means for rotating the carrier-shafts while the carriers are traversing a part of their course and operating to rotate the said shafts and turn the picker-fingers on their longitudinal axes only while the picker-fingers are being thrust into the plants, caused to move in the backward direction and withdrawn from the plants, and stationary strippers in the paths of the picker-fingers through which the said fingers are drawn longitudinally when withdrawn from the plants, the fingers being geared to turn in the backward direction and disengage their points from the cotton while passing through the strippers, substantially as and for the purpose set forth.

13. In a cotton-picking machine, the combination with the shafts F F' and driving-means therefor, sprocket wheels near opposite ends of said shafts, drive-chains traveling on said sprocket-wheels, carriers I journaled at opposite ends in the drive-chains, and caused thereby to travel an endless course oblong in the direction of the length of the machine and practically straight sided, a series of picker-fingers extending from and journaled in one side of each carrier, a drive-shaft I' on each carrier to which the picker-fingers are geared, cam-guide H, arm $e^{10}$ on each carrier at its outer end traveling on the guide H, a roller $e^{13}$ on each carrier, a cam-guide in the path of the said rollers, a projection on each shaft I', rotating means for the shaft I' with which the shafts I' engage during their movement in the backward direction, and a guide $G^4$ in the path of the said projection on each shaft I' engaging said projections during the forward movement of the carriers to hold the shafts I' against rotation, the whole being constructed and arranged to operate substantially as and for the purpose set forth.

14. In a cotton-picking machine, the combination with the traveling rotary picker-fingers of stripper mechanism for the picker-fingers, comprising a series of parallel and adjacent strips of stiff material provided with continuous projecting edges formed of longitudinally extending strips of flexible material, between which the fingers are drawn in the operation of the machine, substantially as described.

15. In a cotton picking machine the combination with the traveling rotary picker-fingers of stripper mechanism for the picker-fingers, comprising a series of adjacent strips, between which the fingers are drawn in the operation of the machine, each strip being formed of two parallel longitudinally extending sections, secured together by a yielding connection, substantially as described.

16. In a cotton-picking machine, the combination with the traveling rotary picker-fingers, of stripper mechanism for the picker-fingers comprising a series of adjacent strips each formed in longitudinal spring connected sections normally out of contact with each other, substantially as and for the purpose set forth.

17. In a cotton-picking machine, the combination with the traveling rotary picker-fingers of stripper mechanism for the picker-fingers comprising a series of adjacent relatively yielding strips between which the fingers are drawn in the operation of the machine, the strips comprising longitudinally-extending strips of flexible material provided on one side with narrower longitudinally and centrally extending strips of stiff material, substantially as described.

18. In a cotton-picking machine, the combination with the traveling rotary picker-fingers, of stripper mechanism for the picker-fingers comprising a series of adjacent strips having flexible edges between which the picker-fingers are drawn in the operation of the machine, and coincident notches affording openings $b^4$ toward the rear ends of the strips, substantially as and for the purpose set forth.

19. In a cotton-picking machine, the combination with the traveling rotary picker-fingers, of stripper mechanism for the picker-fingers comprising a series of adjacent strips each formed in two longitudinal sections normally separated from each other, each section comprising a strip $b'$ of flexible material, and a narrower strip $b^2$ of stiff material fastened together, the sections being connected by springs $b^3$, substantially as and for the purpose set forth.

ANGUS CAMPBELL.

In presence of—
M. J. FROST,
W. N. WILLIAMS.